(12) United States Patent
Gunderson et al.

(10) Patent No.: US 9,565,475 B2
(45) Date of Patent: Feb. 7, 2017

(54) SYSTEM AND METHOD FOR MANAGING PLAYBACK OF STREAMING DIGITAL CONTENT

(71) Applicant: NETFLIX, Inc., Los Gatos, CA (US)

(72) Inventors: Brady Gunderson, Portola Valley, CA (US); Greg Peters, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 347 days.

(21) Appl. No.: 13/650,072

(22) Filed: Oct. 11, 2012

(65) Prior Publication Data

US 2014/0108614 A1    Apr. 17, 2014

(51) Int. Cl.
| | |
|---|---|
| G06F 15/16 | (2006.01) |
| H04N 21/466 | (2011.01) |
| H04N 21/258 | (2011.01) |
| H04N 21/41 | (2011.01) |
| H04N 21/436 | (2011.01) |
| H04N 21/442 | (2011.01) |

(Continued)

(52) U.S. Cl.
CPC .... *H04N 21/4668* (2013.01); *H04N 21/25816* (2013.01); *H04N 21/4126* (2013.01); *H04N 21/43615* (2013.01); *H04N 21/44227* (2013.01); *H04N 21/6547* (2013.01); *H04N 21/6581* (2013.01); *H04N 21/8186* (2013.01); *H04N 21/8193* (2013.01); *H04N 21/4307* (2013.01); *H04N 21/643* (2013.01); *H04N 21/6405* (2013.01)

(58) Field of Classification Search
CPC ............ G06F 15/16; H04N 21/4126; H04N 21/43615; H04N 21/4668; H04N 21/8193; H04N 21/6547; H04N 21/6581; H04N 21/8186; H04N 21/44227; H04N 21/4307; H04N 21/6405; H04N 21/643
USPC ................................. 709/219, 203, 228, 231
See application file for complete search history.

(56) References Cited

U.S. PATENT DOCUMENTS

| | | |
|---|---|---|
| 6,170,060 B1 | 1/2001 | Mott et al. |
| 6,560,651 B2 | 5/2003 | Katz et al. |

(Continued)

FOREIGN PATENT DOCUMENTS

| | | |
|---|---|---|
| CN | 1902608 A | 1/2007 |
| CN | 101924798 A | 12/2010 |

(Continued)

OTHER PUBLICATIONS

Office Action dated Aug. 26, 2014 for U.S. Appl. No. 13/650,076.

(Continued)

*Primary Examiner* — Kostas Katsikis
(74) *Attorney, Agent, or Firm* — Artegis Law Group, LLP

(57) ABSTRACT

One embodiment of the present invention sets forth a playback device designated as a controller is associated with a playback device designated as a playback target. Association is implemented via a local network discovery protocol. The controller issues commands to the target, which then streams digital content directly from a content server. The controller is able to separately stream related digital content for independent, but synchronized playback. Server mediated operations, such as device activation and application installation, are advantageously enabled by explicit association between the controller and the target.

18 Claims, 5 Drawing Sheets

(51) Int. Cl.
*H04N 21/6547* (2011.01)
*H04N 21/658* (2011.01)
*H04N 21/81* (2011.01)
*H04N 21/43* (2011.01)
*H04N 21/6405* (2011.01)
*H04N 21/643* (2011.01)

(56) References Cited

U.S. PATENT DOCUMENTS

| | | | |
|---|---|---|---|
| 8,028,323 B2 | 9/2011 | Weel | |
| 8,254,305 B1* | 8/2012 | Breau et al. | 370/315 |
| 8,387,047 B1 | 2/2013 | Mazin et al. | |
| 8,938,497 B1* | 1/2015 | Wang | H04N 21/44227 709/204 |
| 2002/0013852 A1* | 1/2002 | Janik | H04L 12/2856 709/231 |
| 2002/0068558 A1* | 6/2002 | Janik | H04L 12/2898 455/426.1 |
| 2003/0229900 A1* | 12/2003 | Reisman | G06F 17/30873 725/87 |
| 2005/0251566 A1 | 11/2005 | Weel | |
| 2006/0085835 A1* | 4/2006 | Istvan et al. | 725/119 |
| 2006/0168219 A1* | 7/2006 | Ahluwalia et al. | 709/225 |
| 2006/0291412 A1 | 12/2006 | Naqvi et al. | |
| 2006/0294244 A1 | 12/2006 | Naqvi et al. | |
| 2007/0033622 A1* | 2/2007 | Kim | H04N 7/17318 725/87 |
| 2007/0192462 A1 | 8/2007 | Bae et al. | |
| 2007/0214241 A1* | 9/2007 | Song et al. | 709/219 |
| 2008/0077852 A1* | 3/2008 | Fleishman | G06F 9/4443 715/234 |
| 2008/0126984 A1* | 5/2008 | Fleishman | G06F 9/4443 715/810 |
| 2008/0137690 A1 | 6/2008 | Krantz et al. | |
| 2008/0177998 A1 | 7/2008 | Apsangi et al. | |
| 2008/0201748 A1 | 8/2008 | Hasek et al. | |
| 2008/0201751 A1 | 8/2008 | Ahmed et al. | |
| 2008/0235580 A1* | 9/2008 | Gonze | G06F 9/44526 715/700 |
| 2009/0094317 A1 | 4/2009 | Venkitaraman | |
| 2009/0193469 A1 | 7/2009 | Igarashi et al. | |
| 2010/0070636 A1* | 3/2010 | Skog et al. | 709/228 |
| 2010/0095332 A1 | 4/2010 | Gran et al. | |
| 2010/0100723 A1* | 4/2010 | Yang et al. | 713/150 |
| 2010/0157989 A1 | 6/2010 | Krzyzanowski et al. | |
| 2010/0164693 A1 | 7/2010 | Zhang et al. | |
| 2010/0229045 A1 | 9/2010 | Schultz et al. | |
| 2011/0047598 A1 | 2/2011 | Lindley et al. | |
| 2011/0125809 A1 | 5/2011 | Woods et al. | |
| 2011/0138064 A1 | 6/2011 | Rieger et al. | |
| 2011/0188439 A1 | 8/2011 | Mao et al. | |
| 2011/0281567 A1 | 11/2011 | Moliner et al. | |
| 2011/0302318 A1* | 12/2011 | Birger | H04L 12/2838 709/231 |
| 2011/0303741 A1 | 12/2011 | Bolton et al. | |
| 2011/0320572 A1* | 12/2011 | Damola | 709/219 |
| 2011/0320610 A1 | 12/2011 | Ragunathan et al. | |
| 2012/0047196 A1 | 2/2012 | Poder et al. | |
| 2012/0096121 A1 | 4/2012 | Hao et al. | |
| 2012/0117026 A1 | 5/2012 | Cassidy | |
| 2012/0117182 A1 | 5/2012 | Mountanos | |
| 2012/0117190 A1* | 5/2012 | Park et al. | 709/217 |
| 2012/0124178 A1* | 5/2012 | Sparks | 709/219 |
| 2012/0131610 A1 | 5/2012 | Fernandez Gutierrez et al. | |
| 2012/0185566 A1 | 7/2012 | Nagasaka et al. | |
| 2012/0210350 A1 | 8/2012 | McCoy et al. | |
| 2012/0210352 A1 | 8/2012 | Wong et al. | |
| 2012/0231828 A1 | 9/2012 | Wang et al. | |
| 2012/0245708 A1 | 9/2012 | Birze et al. | |
| 2012/0272266 A1 | 10/2012 | Ou et al. | |
| 2012/0289290 A1* | 11/2012 | Chae | G06F 3/0488 455/566 |
| 2012/0331139 A1* | 12/2012 | Yamada | H04L 12/2816 709/224 |
| 2013/0007443 A1 | 1/2013 | Grab et al. | |
| 2014/0002753 A1* | 1/2014 | Griffin | H04W 88/06 348/734 |
| 2014/0006474 A1* | 1/2014 | White et al. | 709/201 |
| 2014/0040877 A1 | 2/2014 | Goldman et al. | |
| 2014/0089389 A1* | 3/2014 | Kim | H04L 67/42 709/203 |
| 2014/0089821 A1* | 3/2014 | Rios, III | G06F 3/14 715/761 |
| 2014/0222976 A1 | 8/2014 | Ballard et al. | |
| 2015/0074730 A1* | 3/2015 | Huang | H04N 21/4788 725/88 |
| 2015/0135206 A1* | 5/2015 | Reisman | H04N 21/26283 725/18 |
| 2015/0135214 A1* | 5/2015 | Reisman | H04N 21/64322 725/37 |
| 2015/0181285 A1* | 6/2015 | Zhang | H04N 21/42684 725/80 |

FOREIGN PATENT DOCUMENTS

| | | | |
|---|---|---|---|
| DE | 10310746 A1 | 12/2004 | |
| EP | 1705576 A1 | 9/2006 | |
| EP | 2124440 A1 | 11/2009 | |
| GB | 2454547 A * | 5/2009 | H04L 12/46 |
| KR | 20030055766 A * | 7/2003 | H04L 12/12 |
| KR | 20070119129 A * | 12/2007 | |
| WO | WO 2009154249 A1 * | 12/2009 | H04L 12/66 |
| WO | 2010087748 A1 | 8/2010 | |

OTHER PUBLICATIONS

International Search Report for PCT/US13/64523, dated Apr. 29, 2014.
International Search Report for PCT/US13/64533, dated Apr. 17, 2014.
Thiago Sales et al., "A UPnP extension for enabling user authentication and authorization in pervasive systems", Journal of the Brazilian Computer Society, vol. 16, No. 4, Oct. 7, 2010, pp. 261-277.
UPNP Forum: "UPnP Device Architecture 1.1", www.upnp.org, XP-002562314, Jan. 8, 2010, pp. I-VI, pp. 1-136.
Extended European search report for Application No. PCT/US2013/064523, dated Feb. 26, 2016, 10 pages.
Extended European search report for Application No. PCT/US2013/064533, dated Mar. 2, 2016, 10 pages.
Ahmet M Eskicioglu, John Town, Edward J Delp, Security of digital entertainment content from creation to consumption, Apr. 2003, Elservier, Signal Processing: Image Communication, vol. 18, Issue 4, pp. 237-262.
Subramanya, S.R.; Digital rights management, Mar.-Apr. 2006, IEEE, Potentials, vol. 25, Issue 2, pp. 31-34.
Bloom, J.A.; Cox, Ingemar J.; Kalker, T.; Linnartz, J-P.M.G., Copy protection for DVD video, Jul. 1999, IEEE, Proceedings of the IEEE(vol. 87, Issue: 7).

* cited by examiner

SYSTEM AND METHOD FOR MANAGING PLAYBACK OF STREAMING DIGITAL CONTENT

BACKGROUND OF THE INVENTION

Field of the Invention

Embodiments of the present invention relate generally to digital media and, more specifically, to a system and method for managing playback of streaming digital content.

Description of the Related Art

One popular model for consumer content delivery involves transmitting digital content files from a content server directly to a content player via a communications network. The content server is typically a computer system in a secure machine room configured to store digital content files that can be streamed to the content player via the communications network. Each digital content file is associated with metadata related to the contents of the digital content file. The metadata typically includes a specific identifying title, such as "Gone with the wind," which is likely to be familiar to a user. A given digital content file may be discovered and selected by the user and streamed from the content server to the content player prior to or during playback. The user may discover a particular title via a metadata search, such as a title name search.

The content player may be implemented as an application that executes on a playback device comprising a computing platform, which may be integrated within a dedicated device such as a television panel, set-top box, or mobile device. The digital content files may comprise digitally encoded songs and sound tracks, movies, television programs, and so forth. The content player typically downloads and buffers at least a portion of the digital content file to facilitate uninterrupted playback of the title. A given device may be configured to include a content player application by the device manufacturer, or the content player may be loaded and configured by a user prior to use.

Oftentimes, multiple different devices capable of acting as content players may be present in a given setting. For example, a user may be in their living room with both a mobile phone and a television panel, both of which may capable of executing a suitable content player application. In this example, the television panel may be a superior option for viewing digital content; however, the mobile device may have superior user interactivity features for searching content. The user may be able to efficiently find a particular title using their mobile device, but they are still required to perform essentially the same operations using a typically cumbersome user interface implemented by the television panel remote control. This results in an inefficient playback experience.

One approach for improving the playback experience involves the mobile device being configured to act as a playback master and the television panel being configured to act as a playback slave. With this approach, the user may search content and select a title for playback using the mobile device, and then stream a live playback session to the television panel. While this approach allows the user to better manage playback, the mobile device is tied up acting as the playback master. If the mobile device drops off the network for any reason, such as the user taking the mobile device to a location with poor network connectivity, then the playback session to the television panel is interrupted.

As the foregoing illustrates, what is needed in the art is technique for enabling more efficient management of multiple content player devices.

SUMMARY OF THE INVENTION

One embodiment of the present invention sets forth a method for directing a target device to play a selected title, comprising discovering the target device with a local network, exchanging unique identifiers with the target device to establish an association with the target device, identifying to a content server the target device as an associated device, determining whether the target device includes a service application through which the target device can communicate with the content server; and if the target device includes the service application, then causing the service application to request the selected title from the content server.

Other embodiments include, without limitation, a computer-readable medium that includes instructions that enable a processing unit to implement one or more aspects of the disclosed methods as well as a system configured to implement one or more aspects of the disclosed methods.

One advantage of the disclosed systems and methods is that a control device may easily manage operations of a target playback device, including activation, installation, or any combination thereof of a corresponding service application. A second advantage is that a plurality of related devices may be associated with each other and advantageously interact using server-mediated operations based on association. This is in contrast to prior art solutions with complex, manual, and inefficient management procedures between two devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
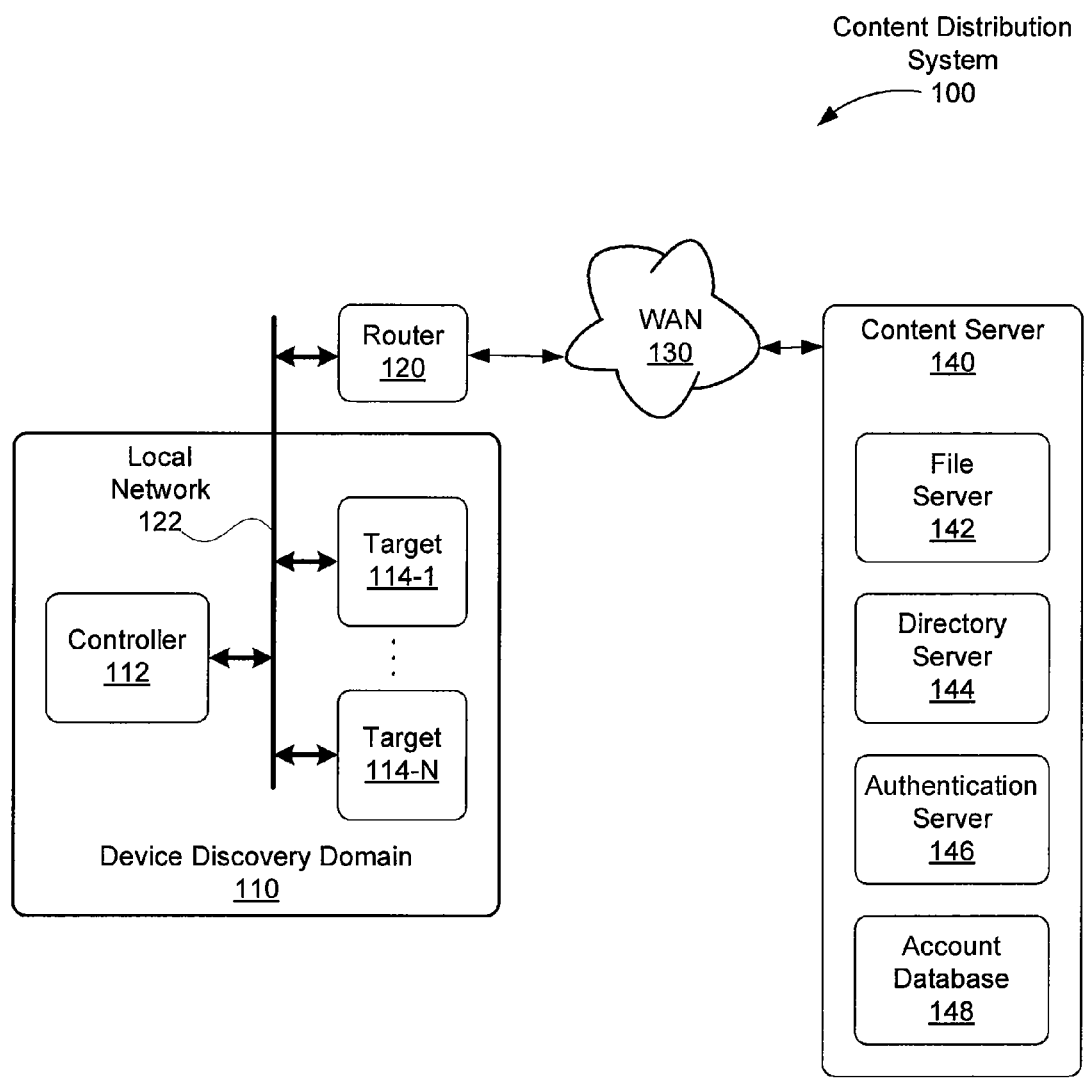
FIG. 1 illustrates a content distribution system, configured to implement one or more aspects of the present invention.

FIG. 1 illustrates a content distribution system 100 configured to implement one or more aspects of the present invention. The content distribution system 100 includes a content server 140, a wide area network (WAN) 130, a router 120 coupled to a local network 122, a controller 112 and at least one target 114.

The content server 140 includes one or more server applications, implemented to execute on one or more computer servers. Each computer server may comprise a hardware computer system or a virtual computer system running on an arbitrary collection of one or more hardware computer systems. Content server 140 may implement a file server 142, a directory server 144, an authentication server 146, or any combination thereof. In one embodiment, file server 142, directory server 144, and authentication server 146 are implemented as applications running on one or more computer systems coupled to WAN 130. Each one of the one or more computer systems may be an independent hardware computer system, cluster of hardware systems, distributed hardware system, or a virtual computer system hosted by an arbitrary hardware configuration including one or more independent hardware computer systems.

File server 142 is configured to store and retrieve digital content files for download to controller 112, targets 114, or a combination thereof. In one embodiment, a given digital content file is downloaded via WAN 130 and router 120. A plurality of file servers, potentially distributed to include multiple connections to WAN 130, may be employed to scale up total download bandwidth, for example, to satisfy overall download demand. Directory server 144 implements any technically feasible mechanisms to enable a controller 112 or target 114 to locate a particular title within a catalog of titles for download of one or more corresponding digital content files from file server 142. A particular title may have one or more associated digital content files, corresponding to different encoding formats for the title. For example, a particular title may have a plurality of associated digital content files containing video encoded in different resolutions and frame rates. As another example, a particular title may have a plurality of associated digital content files containing audio tracks dubbed in different languages. In one embodiment, directory server 144 stores metadata associated with each title, and a title search operation comprises searching for matching metadata.

In one embodiment, authentication server 146 is configured to provide authentication credentials to enable a particular controller 112 or target 114 to gain access to digital content files stored on file server 142. The authentication credentials may also be used to mediate access to directory server 144. In one embodiment, authentication server 146 queries an account database 148 for account authorization information, such as whether a particular account is authorized to access file server 142 or specific titles residing within file server 142. Account database 148 may also include individual account data, such as viewing preferences, title access history, title selection affinities, ratings data, recommendation data, social connectivity data, and the like. In one embodiment, each account may include individualized account data for one or more users.

WAN 130 may be implemented using any technically feasible system configured to transport digital data between the content server 140 and router 120. In one embodiment WAN 130 substantially comprises a switching and routing network based on the industry standard internet protocol (IP). The popular "Internet" communications network is one example of a suitable IP-based communications network. Router 120 comprises a digital packet router configured to couple WAN 130 to local network 122. In one embodiment, router 120 includes a WAN modem, such as a cable modem or digital subscriber line (DSL) modem, as well as a digital wireless modem configured to interoperate with an institute for electrical and electronics engineers (IEEE) standard 802.11 wireless communications system. In such an embodiment, local network 122 may include an arbitrary combination of wireless and wired digital communications channels. Wired Ethernet is one example of a wired digital communications channel.

Controller 112 and targets 114 implement a playback application for the digital content files available from the file server 142. A given digital content file may include data for audio playback, video playback, or combined audio and video playback. Playback of video and audio content may be synchronized via a local time signal. A digital content file may also include alternative content such as subtitles, video overlays, programmatically generated behavior, and the like. Playback of the alternative content may be synchronized to the playback video and audio content via the local time signal. In one embodiment, the playback application includes a time synchronization client configured to synchronize the local time signal to a time reference signal generated by content server 140. Any technically feasible time synchronization technique may be implemented to synchronize the local time signal with the time reference signal, such as techniques implemented in the well-known network time protocol (NTP).

As a consequence of controller 112 and targets 114 synchronizing their respective local time signals to the time reference signal, the local time signals are also synchronized to each other. Digital content playback can therefore be beneficially synchronized between or among the controller and targets 114, for example to synchronize subtitle playback on controller 112 with video playback on target 114-1. In one embodiment, subtitles in a selected language are displayed on target 114-1 and subtitles in a different language may be displayed on a different target, such as target 114-N. In such a scenario, video for targets 114-1 and 114-N are beneficially synchronized during playback.

Devices that are locally connected to local network 122 comprise a device discovery domain 110. As shown, controller 112 and targets 114-1 through 114-N are devices that comprise device discovery domain 110. Any additional devices (not shown) connected to local network 122 may also be included in device discovery domain 110. Devices within device discovery domain 110 implement a discovery protocol that facilitates co-discovery between and among the devices. In one embodiment, the devices implement a discovery protocol known in the art as the simple service discovery protocol (SSDP), which enables appropriately configured devices to both advertise their presence on a network and discover each other within a network. SSDP uses multicast hypertext transfer protocol (HTTP) messaging to announce establishment of a service (e.g., to announce presence on the network) and unicast signaling to reply to a multicast message. Device discovery domain 110 comprises a multicast group for the multicast HTTP messaging. One device may discover another device within device discovery domain 110 using a technique known in the art as an M-SEARCH method, whereby a device transmits a multicast message to the multicast group upon being added to device discovery domain 110. The device may continue to transmit multicast messages to allow other devices to maintain a list of current devices within device discovery domain 110. Each recipient of a multicast message replies to the sender with a unicast message. Over time, devices within device discovery domain 110 accumulate a current list of the current devices. In another embodiment, the devices implement a discovery protocol known in the art as universal plug and play (UPnP), modeled after SSDP, which specifically enables advertising multimedia playback capabilities.

After each device within device discovery domain 110 is aware of the other devices, certain of the devices may become associated, with one device designated as a controller, such as controller 112, and another device designated as a target, such as target 114-1. In one embodiment, a device explicitly performing a discover operation is designated to be controller 112 and a device being discovered by controller 112 is designated as a target 114. For example, an Android™ mobile phone may be directed by a user to discover devices suitable to act as playback targets, and a Sony™ PS3™ may be discovered by the mobile phone. In this example, the mobile phone is controller 112 and the PS3 is a target 114.

In one embodiment, two devices exchange an identifier known in the art as a universally unique identifier (UUID) to establish an association. Any technically feasible technique may be implemented to generate each UUID. In one embodiment, an Ethernet address for a device comprises at least a portion of a UUID associated with the device. In one implementation, target 114 returns a UUID as part of the discovery process. In another embodiment, devices exchange a unique service name (USN) to establish a connection. Any technically feasible technique may be implemented to generate and exchange the USN, for example target 114 may return a USN as part of the discovery process.

Figure 2:
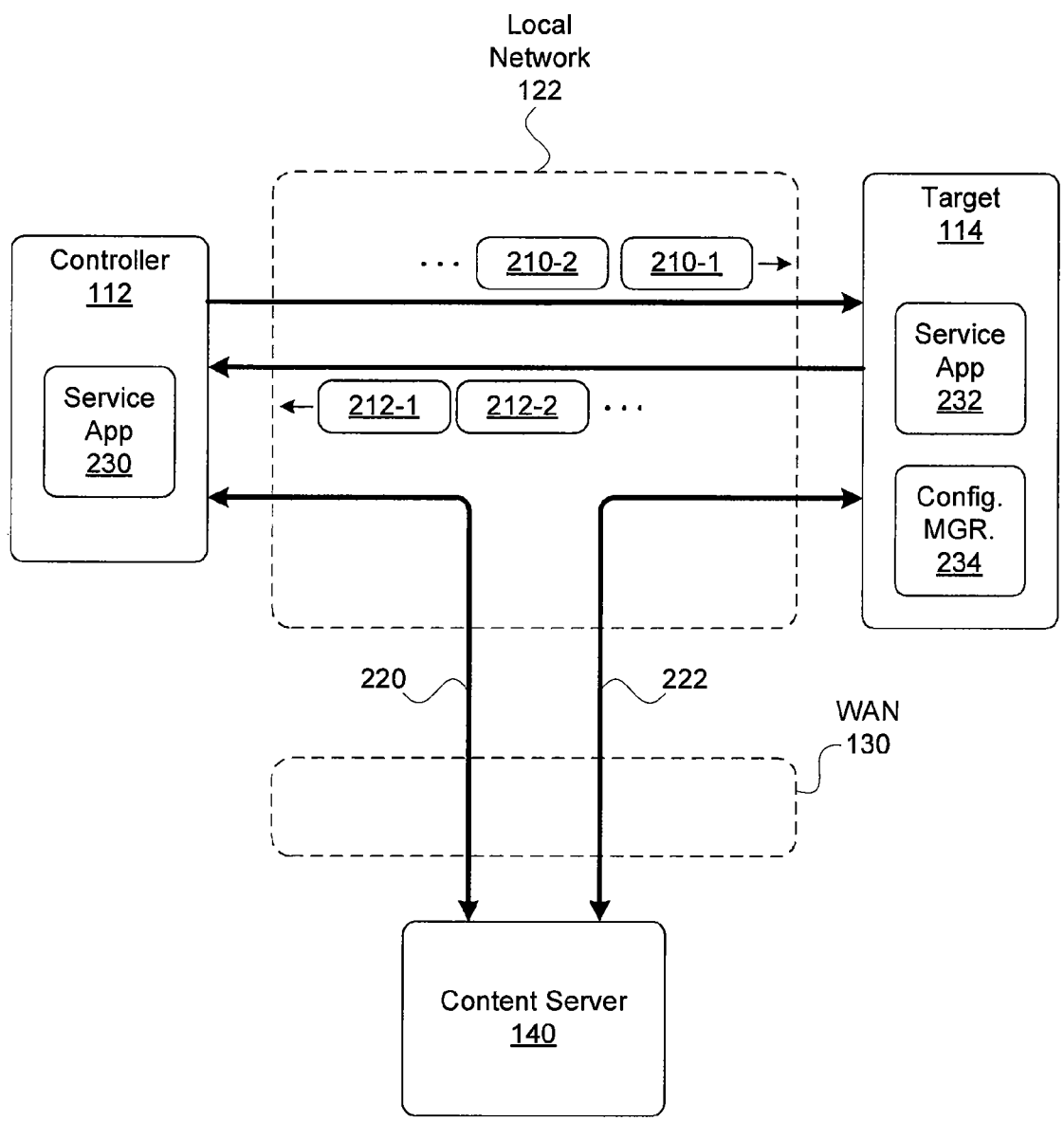
FIG. 2 illustrates interactions between a controller and a target, according to one embodiment of the present invention.

FIG. 2 illustrates interactions between controller 112 and a target 114, according to one embodiment of the present invention. As shown, controller 112 and target 114 communicate via local network 122. Controller 112 transmits commands 210 to target 114 and target 114 transmits events 212 back to controller 112. Furthermore, controller 112 may establish a communication link 220 with content server 140 and target 114 may establish a separate communication link 222 with content server 140.

A user may direct service application 230 to perform title searches, based on data stored within content server 140, for example, by querying directory server 144 via communications link 220. The user may also direct service application 230 to play content streamed via communications link 220 on controller 112. The user may further direct service application 230 to discover target devices, such as target 114, coupled to local network 122. Upon discovering target 114, service application 230 may associate with service application 232, residing within target 114. Once service application 230 and service application 232 are associated, service application 230 may transmit commands 210, for example, to direct service application 232 to play content by streaming the content via communications link 222 from content server 140. Target 114 may transmit events 212 back to controller 112 to provide, for example, playback status. In one embodiment, controller 112 comprises a mobile device and service application 230 comprises an application configured to execute on the mobile device. Additionally, target 114 may comprise a set top device or television panel with embedded network streaming capability (a "smart television"), and service application 232 comprises a streaming playback application configured to stream digital content from content server 140 via communications link 222.

In one embodiment, controller 112 and target 114 each transmit to content server 140 UUID sets defining their association. Knowledge of this association allows content server 140 to mediate interaction between controller 112 and target 114. For example, with the association in place between controller 112 and target 114, content server 140 may grant a request by controller 112 to activate target 114 based on an account associated with controller 112.

The association establishes a context within which target 114 may accept commands 210 from controller 112. Commands 210 may be encrypted or signed using any technically feasible techniques to provide a secure transmission regime between controller 112 and target 114. Similarly, events 212 may be encrypted or signed.

In one embodiment, commands 210 include, without limitation, play, stop, and pause. Additional commands 210 may include seeking, forwarding, and reversing. Commands 210 may be used to identify a particular piece of content, and to instruct service application 232 to stream the piece of content from content server 140. Service application 232 streams the content via communications link 222, which may be established using shared physical network elements, such as local network 122 and WAN 130. Service application 230 may operate independently of service application 232, allowing a user to perform other tasks on controller 112 while target 114 executes playback commands. Service application 230 may present a set of remote control user interface buttons within a touch-based interface to provide a user with a familiar set of commands.

In one embodiment, a configuration manager 234 residing within target 114 is configured to participate in device discovery. In certain implementations of target 114, service application 232 is preinstalled by the manufacturer of target 114. In such scenarios, configuration manager 234 would be configured to activate service application 232. One goal of activation is to associate a particular use with account information for the user. The account information may include billing information as well as viewing preferences for individualizing a user experience.

In alternative embodiments of target 114, service application 232 may not be installed by the manufacturer of target 114. In such embodiments, configuration manager 234 would be installed to provide general configuration and installation services for target 114. For example, a smart television may be manufactured to include configuration manager 234, which provides installation services that enable a user to install service application 232.

In one embodiment, configuration manager 234 also provides a feature known in the art as "wake on LAN," which allows target 114 to operate in a standby mode having substantially reduced power consumption. A small set of hardware features remain active during the standby mode and listen for an arrival of a network packet having a network identifier associated with target 114. If a data packet arrives having the network identifier associated with target 114, then target 114 transitions to a power-on state, facilitating full interaction. For example, a smart television may remain in standby mode until discovered by controller 112. Once the smart television is discovered, controller 112 may be associated with the smart television. At this point, the smart television may not necessarily turn fully on to display images until controller 112 instructs the smart television to turn on by transmitting one or more appropriate commands 210.

If the smart television was manufactured without service application 232 being installed, then controller 112 may direct configuration manager 234 to connect to content server 140, which may be associated with a particular service provider, to retrieve and install service application 232. After service application 232 is installed within target 114, the device may be independently activated or activated based on account credentials associated with controller 112.

In one embodiment, a discovery and launch (DIAL) protocol, based on SSDP, is implemented by configuration manager 234.

In one embodiment, service application 230 controls playback of titles by service application 232, but may perform other, additional actions for the user. For example, service application may present content recommendations on a display screen of controller 112. The content recommendations may be timed close to the end of a title being played by target 114, or based on time-correlated metadata associated with the title, such as based on current actors on-screen, or other on-screen or related information. The content recommendations may be based on recommendations derived from metadata for other user accounts associated with devices within device discovery domain 110 of FIG. 1. For example, in a setting where two or more individuals are carrying a device having a service application 230, the content recommendation may be based on combined affinities for the two or more individuals. Such a recommendation is made possible and mediated by content server 140 by associations formed among devices belonging to the two or more users and reported to content server 140, which is able to access affinity information for each user.

In one embodiment, users form social connections and user metadata may be shared with others within a connected social group. When individuals within the social group are physically co-located, their devices may be associated, enabling server mediated recommendations to be generated. One form of metadata is a recommendation, where a user rates a particular title. In one embodiment, a collection of ratings is used to generate a statistical affinity for one or more users based on certain metadata associated with different titles. From the statistical affinity, server mediated individual recommendations may be generated, and server mediated group recommendations may be generated, for example, when different users gather within a device discovery domain 110.

In one embodiment, service application 230 is configured to provide a synchronized playback on controller 112 of a current title being played by target 114. Rather than simply mirroring the content being displayed by target 114, controller 112 is configured to show additional information such as subtitles and time-correlated metadata, such as on-screen actors. Additionally, service application 230 may be configured to enable a user to rate the current title by asserting to a user interface control, such as a button. When service application 230 receives user input in the form of a rating, the rating, along with identifying title information, may be transmitted to account database 148 to be stored along with other user data.

As the foregoing illustrates, decoupling playback responsibilities of service application 230, within controller 112, from those of service application 232, within target 114, enables greater flexibility. Additionally, allowing one or more service applications to form associations within device discovery domain 110 advantageously enables server-mediated features related to user proximity.

In one embodiment, controller 112 is configured to temporarily activate a target 114 based on a user account associated with controller 112. For example, a user may temporarily activate a hotel television configured to act as a target. In such a scenario, an activation duration may be specified based to a hotel stay duration or based on the controller 112 remaining within proximity to the hotel television.

Figure 3:
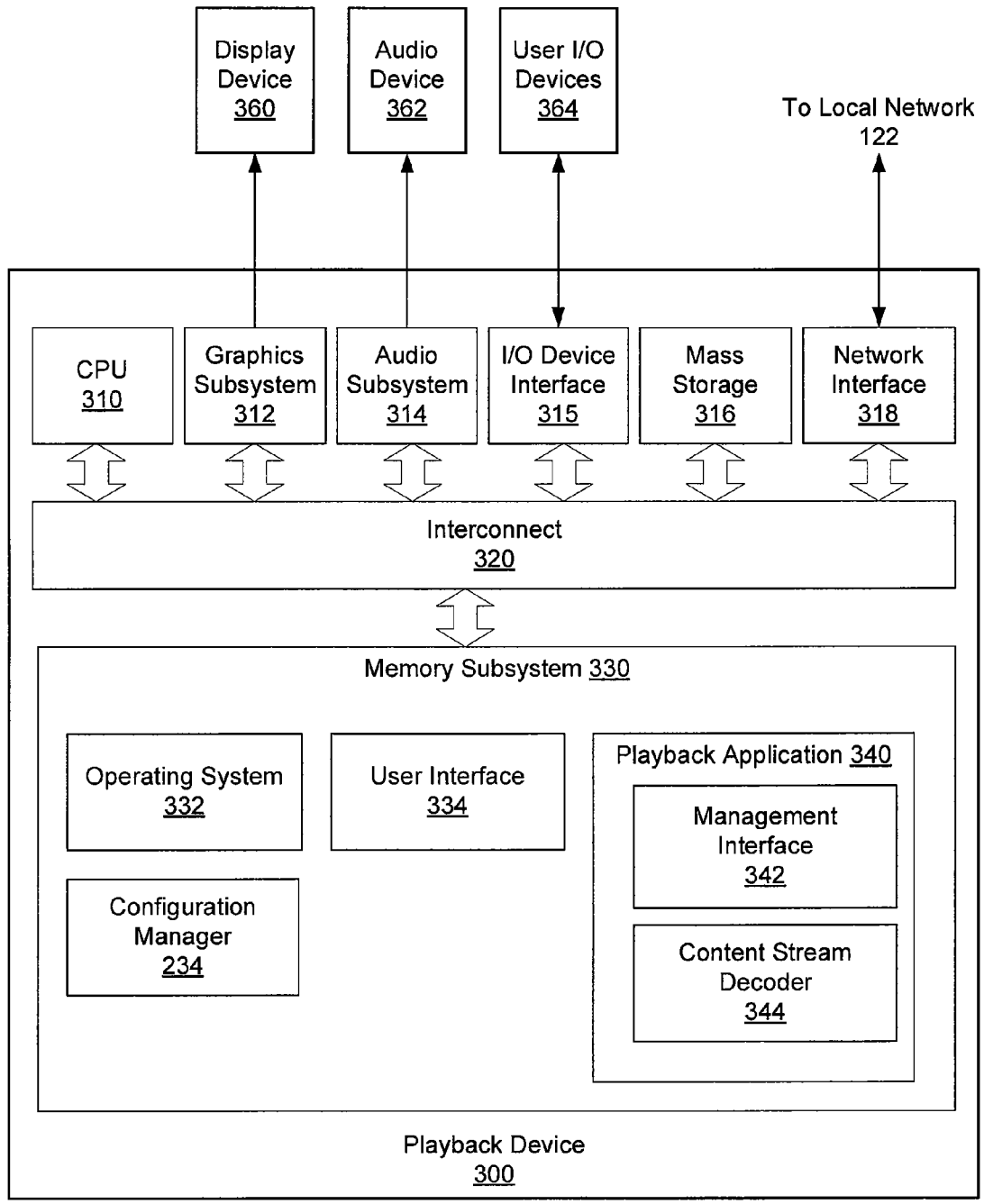
FIG. 3 is a system diagram of a playback device, according to one embodiment of the present invention.

FIG. 3 is a system diagram of a playback device 300, according to one embodiment of the present invention.

Playback device 300 may comprise controller 112 and target 114. Playback device 300 may include, without limitation, a central processing unit (CPU) 310, a graphics subsystem 312, an audio subsystem 314, an input/output (I/O) device interface 315, a network interface 318, an interconnect 320, and a memory subsystem 330. Playback device 300 may also include a mass storage unit 316.

CPU 310 is configured to retrieve and execute programming instructions stored in a memory subsystem 330. CPU 310 retrieves the programming instructions from the memory subsystem 330 via interconnect 320, which is configured to facilitate transmission of data, such as the programming instructions and application data, between CPU 310 and other subsystems. The other subsystems may include, without limitation, graphics subsystem 312, audio subsystem 314, I/O devices interface 315, mass storage unit 316, network interface 318, and memory subsystem 330.

Graphics subsystem 312 is configured to generate frames of video data, such as a sequence of graphics images, and to transmit the frames of video data to display device 360. Graphics subsystem 312 is coupled to CPU 310 via interconnect 320. In one embodiment, graphics subsystem 312 is embedded into an integrated circuit, along with CPU 310. Display device 360 may comprise any technically feasible means for generating an image for display. For example, display device 360 may utilize liquid crystal display (LCD) technology, cathode-ray technology, or light-emitting diode (LED) display technology (either organic or inorganic) to produce a visual representation of the frames of video data.

Audio subsystem 314 is configured to generate one or more electrical audio signals corresponding to a digital audio stream. For example, audio subsystem 314 may receive a sequence of binary digital values comprising the digital audio stream and generate one or more analog electrical audio signals that correspond to the binary digital values. Audio device 362 includes a speaker or earphone configured to generate an acoustic output in response to the electrical audio signals. In alternative embodiments, display device 360 may include audio device 362 within in a single unit. A television is an example of a device known in the art that incorporates both a display device such as display device 360, and an audio device, such as audio device 362.

Input/output (I/O) device interface 315 is configured to receive input data from user I/O devices 364 and transmit at least a portion of the input data to CPU 310 via interconnect 320. For example, user I/O devices 364 may include one or more buttons, a keyboard, and a mouse, a touch screen, or any other pointing device. User I/O devices 364 may also include indicator devices such as light emitting diodes, liquid crystal display indicators, and the like.

Mass storage unit 316 is configured to store non-volatile data. Mass storage unit 316 may be implemented using a single storage device or an array of storage devices. Each storage device may comprise a magnetic hard disk drive, a flash drive, or any other technically feasible non-volatile storage device. The non-volatile data may include, without limitation, a boot image of an operating system, applications, application data, and locally stored digital content files. Mass storage unit 316 is coupled to CPU 310 via interconnect 320. Network interface 318 is configured to transmit and receive packets of data via local network 122. In one embodiment, network interface 318 is configured to communicate using the well-known Ethernet standard. Network interface 318 is coupled to CPU 310 via interconnect 320.

Memory subsystem 330 includes programming instructions and data that comprise an operating system 332 and applications, such as playback application 340. Operating system 332 performs system management functions, such as functions to manage hardware devices including network interface 318, mass storage unit 316, I/O device interface 315, audio subsystem 314, and graphics subsystem 312. Operating system 332 also provides a run time model for a user interface 334, playback application 340, and configuration manager 234 of FIG. 2. User interface 334 provides a specific structure, such as a window and object metaphor, for user interaction with features of playback device 300. Persons skilled in the art will recognize the various operating systems and run time models known in the art are suitable for incorporation into playback device 300, or may serve as exemplary models for operating system 332.

In one embodiment, user interface 334 is configured to generate a graphical user interface on display device 360. The user operates user I/O devices 364, in conjunction with user interface 334, to select the one or more titles for playback. Playback application 340 then retrieves digital content data associated with the selected titles for playback. The digital content is downloaded, decoded, and played to display device 360 via graphics subsystem 312 and the audio device 362 via audio subsystem 314. In one embodiment, graphics subsystem 312 is configured to generate subtitles, which may be synchronized to video and audio playback.

Playback application 340 is configured to retrieve digital content data from file server 142 of FIG. 1 via the network interface 318 and to play the digital content data to display device 360 and audio device 362. Playback application 340 includes, without limitation, a management interface 342 and a content stream decoder 344. In one embodiment, management interface 342 implements features to facilitate playback of content locally on playback device 300. In another embodiment, management interface 342 implements features to facilitate playback of content locally, as well as playback of content on other devices acting as targets 114.

Content stream decoder 344 implements a decoder for encoded video streams and a decoder for encoded audio streams. In one embodiment, the digital content streamed from content server 140 comprises an encoded video stream and an encoded audio stream, both structured for synchronized decoding by content stream decoder 344, which generates corresponding video frames from the encoded video stream and audio samples from the encoded audio stream.

In one embodiment, playback application 340 comprises service application 230 of FIG. 2 and playback device 300 operates as controller 112. In this embodiment, playback application 340 may request title and catalog information from directory server 144 and present the information to the user via the user interface 334. The user is able to interact with user interface 334 to select a title for playback. Service application 230 may play content back locally, or transmit commands 210 to service application 232, instructing service application 232 to retrieve and play the selected title.

In a different embodiment, playback application 340 comprises service application 232 and playback device 300 operates as target 114. In this embodiment, playback application 340 receives commands 210 from service application 230 that identify a title for playback and commands 210 for initiating playback of the title. In response to commands 210, playback application 340 retrieves data associated with the title for playback.

Figure 4:
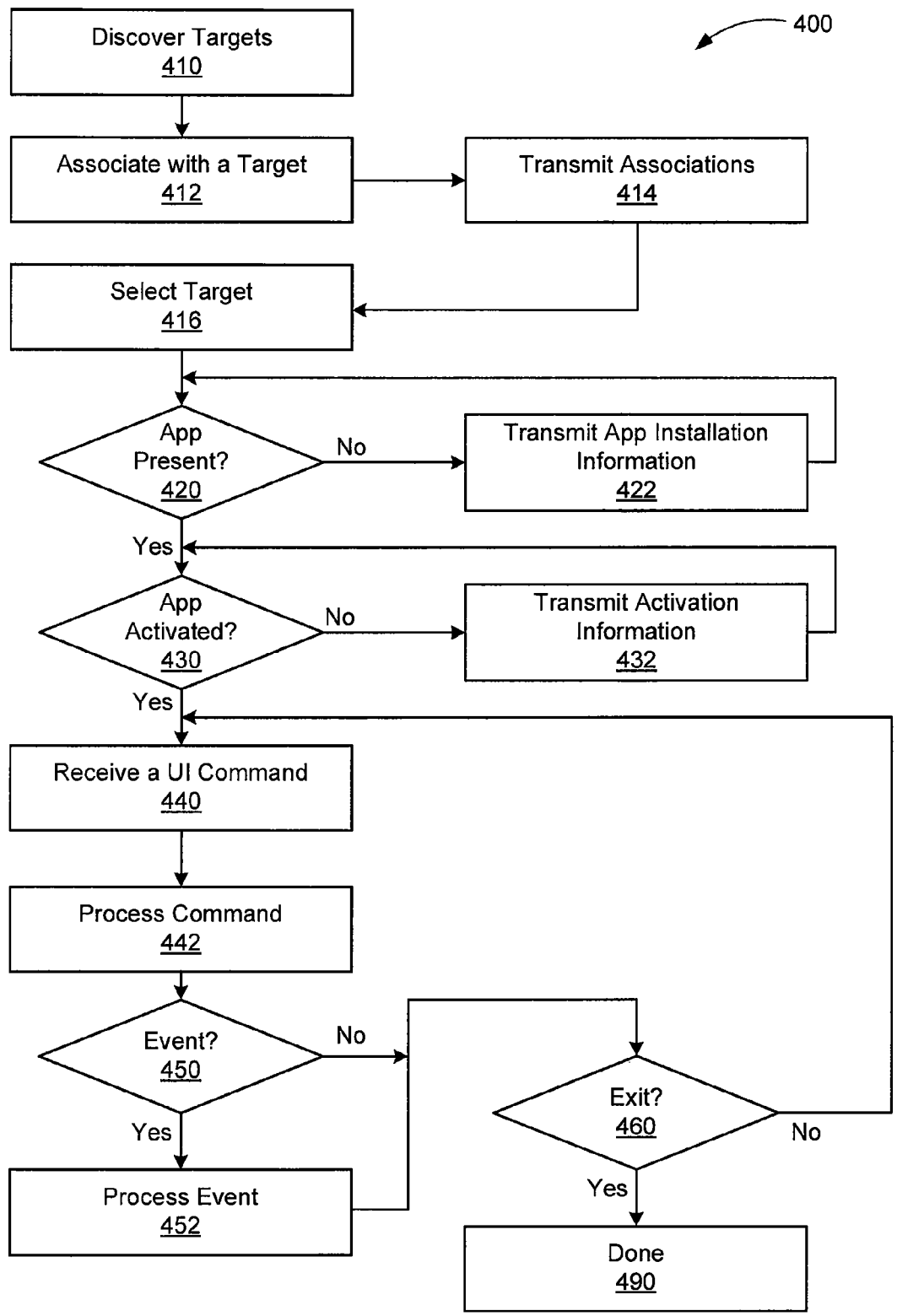
FIG. 4 is a flow diagram of method steps, performed by a controller for directing a target to play a selected title, according to one embodiment of the present invention.

FIG. 4 is a flow diagram of method 400, performed by a controller for directing a target to play a selected title, according to one embodiment of the present invention. Although the method steps are described in conjunction with the systems of FIGS. 1-3, persons skilled in the art will understand that any system configured to perform the method steps, in any order, is within the scope of the invention.

Method 400 begins in step 410, where the controller, such as controller 112, discovers targets within a device discovery domain, such as device discovery domain 110. In one embodiment an SSDP-based protocol, such as UPnP, is implemented to perform discovery as discussed previously in FIGS. 1 and 2. In step 412, the controller associates with a target, such as target 114. A UUID or USN may be exchanged between the controller and each one of the discovered targets to establish a unique context for interaction between the controller and each target. In step 414, the controller transmits information describing a set of associations established between the controller and discovered targets to a content server, such as content server 140. In one embodiment, the associations comprise UUID or USN pairs, which are transmitted to the content server. These associations enable the content server to perform mediated operations between the controller and associated (co-located) targets. In step 416, a user selects a target to control. In one embodiment, the controller displays a list representing discovered targets, and the user selects a target from the list to control. In other embodiments, a set of targets may be selected.

If, in step 420, an appropriate playback application is installed on a selected target, then the method proceeds to step 430. In one embodiment, the controller queries the selected target to determine whether the playback application is installed and available. Any technically feasible query mechanism may be implemented without departing the scope and spirit of embodiments of the present invention.

If, in step 430, an appropriate playback application is activated on the selected target, then the method proceeds to step 440, where the controller receives a user interface (UI) command from a user. The command may include, without limitation, search commands to be executed by the content server, playback commands to be executed by either the controller or the selected target. In step 442, the controller processes the command. For example, the controller may transmit a search query to the content server, or the controller may transmit a play command to the target. In one scenario, the controller transmits a command to request the selected title for playback.

If, in step 450, an event is received, then the method proceeds to step 452, where the controller processes the event. The event may be received from the content server or the target. One exemplary event originating from the content server is a play command for displaying a recommendation on the controller prior to a current title concluding on the target. One exemplary event originating from the target is a playback status indicator.

If, in step 460, the controller receives an exit command, then the method terminates in step 490. Otherwise, the method proceeds back to step 440.

Returning to step 420, if an appropriate playback application is not installed on a selected target, then the method proceeds to step 422. In one embodiment, the controller transmits installation information to that target to begin downloading an appropriate playback application. The installation information may include, without limitation, a uniform resource locator, web address, IP number, or other address information for a server, such as the content server, configured to provide the playback application for download. In this embodiment, the target acts on the installation information because the target and controller are currently associated with each other.

Returning to step 430, if appropriate playback application is not activated on the selected target, then the method proceeds to step 432. In one embodiment, the controller transmits an activation credential to the target based on associated account information. The target then presents the activation credential to the content server to become activated.

Returning to step 450, if an event is not received, then the method proceeds to step 460.

Figure 5:
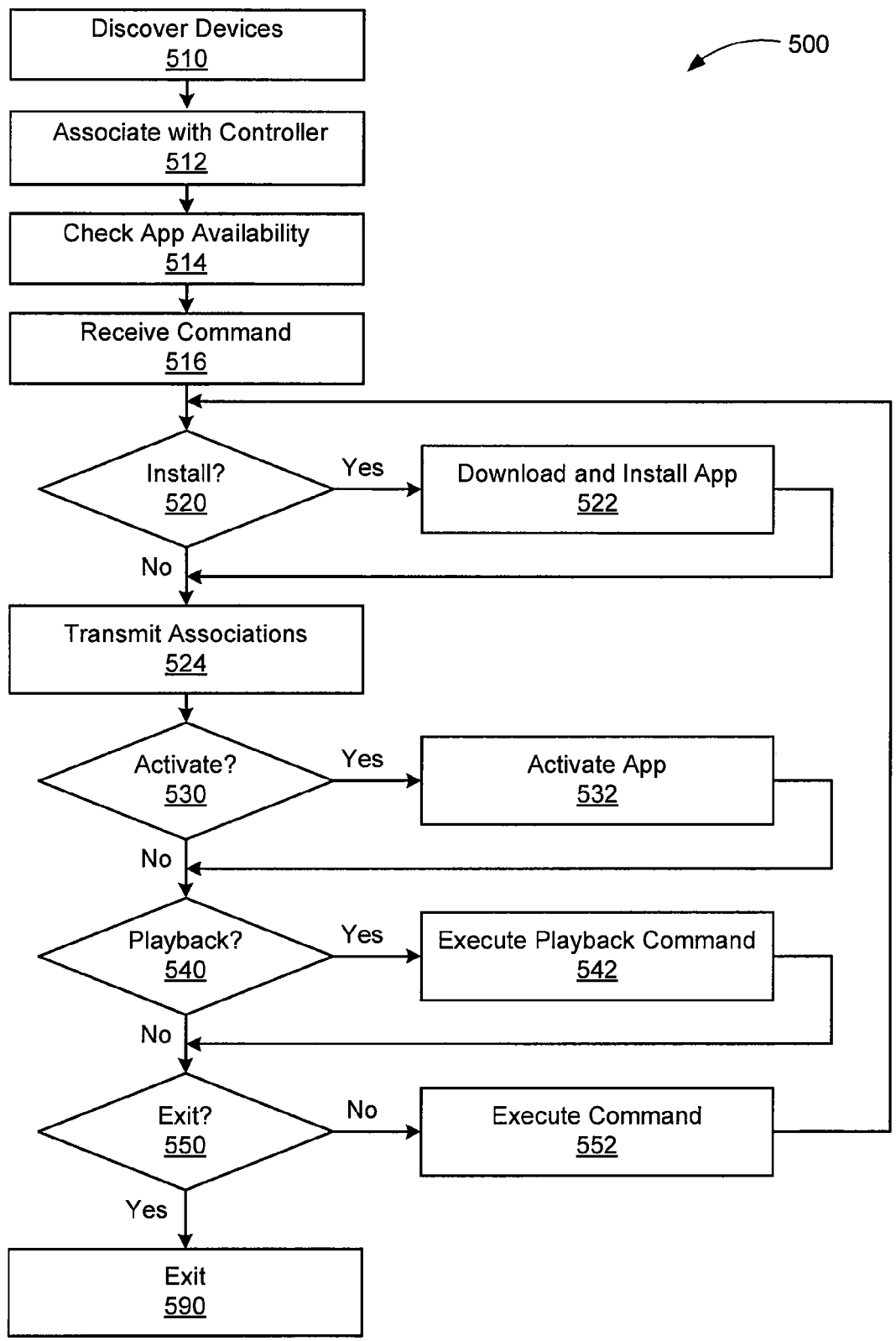
FIG. 5 is a flow diagram of method steps, performed by a target for playing a selected title, according to one embodiment of the present invention.

FIG. 5 is a flow diagram of method 500, performed by a target for playing a selected title, according to one embodiment of the present invention. Although the method steps are described in conjunction with the systems of FIGS. 1-3, persons skilled in the art will understand that any system configured to perform the method steps, in any order, is within the scope of the invention.

Method 500 begins in step 510, where that target, such as target 114, discovers devices within a device discovery domain, such as device discovery domain 110. In one embodiment an SSDP-based protocol, such as UPnP, is implemented to perform discovery as discussed previously in FIGS. 1 and 2. In step 512, the target associates with a controller, such as controller 112. A unique identifier, such as a UUID or a USN, may be exchanged between the target and the controller to establish a unique association and context for interaction between the target and the controller. In step 514, the target determines availability of a specified service application from a list of available applications on the target device. Any technically feasible technique may be implemented to maintain a list of available applications. In step 516, the target receives a command. In one scenario, the command is received from the controller. In another scenario, the command is received from the content server.

If, in step 520, the command is an install command, then the method proceeds to step 522, where the target downloads and installs the specified service application, such as service application 232. In one embodiment, a configuration manager, such as configuration manager 234, within the target downloads an installation package from the content server and extracts an executable service application from the installation package and stores the service application within the target. The configuration manager then adds the service application to the list of available applications. In one embodiment, details related to specifying the service application are included in the command or in a related command.

In step 524, the target transmits an association established between the target and the controller to a content server, such as content server 140. This association enables the content server to perform mediated operations between the controller and the target, such as granting activation permission to the target based on account credentials for the controller.

If, in step 530, the command is an activate command, then the method proceeds to step 532, where the target performs an activation procedure with the content server based on association with the controller. In one embodiment, the association is based on exchanged unique identifiers. Association with the controller enables the target to use account credentials for activation with the content server. The account credentials may be associated with the controller, the target, other discovered devices within device discovery domain 110, or any combination thereof. In one embodiment, account credentials specifically associated with the controller are used for activation of the target.

If, in step 540, the command is a playback command, then the method proceeds to step 542, where the target executes the playback command. Exemplary playback commands include specifying a particular title for playback, initiating playback, pausing playback, aborting playback, fast forwarding, and seeking based on time or content organization, such as scenes. Upon initiating execution of the playback command, the method proceeds back to step 516.

If, in step 550, an exit signal is not received, then the method proceeds to step 552, where the target executes the command, which may be a house-keeping command, control command, activity synchronization command, or any other technically feasible command that should be executed by the target.

Returning to step 520, if the command is not an install command, then the method proceeds to step 524.

Returning to step 530, if the command is not an activate command, then the method proceeds to step 540. If, in step 540, the command is not a playback command, then the method proceeds to step 550. If, in step 550, an exit signal is received, then the method terminates in step 590.

One embodiment of the present invention is implemented as a program product stored on at least one computer-readable storage medium residing within the playback device 300. In such an embodiment, the playback device 300 comprises a general purpose computing platform, such as a smart phone computing platform, or an embedded computer platform such as a set top box or "smart television." The stored program product enables methods 400 and 500 to be implemented by the playback device 300. In an alternative embodiment, a program product is downloaded to a memory within playback device 300. For example, the downloaded program product may be executable instructions embedded within an internet web site, such as content server 140, or an on-line application store. In such an embodiment, the downloaded program product enables methods 400 and 500 to be implemented by the playback device 300.

In sum, a technique for managing playback of digital content is disclosed. A controller device and a target device discover each other on a local network using a local discovery protocol. Devices that discover each other are able to associate with each other and to report their association to a content server that is then able to mediate interactions between the controller and the target. For example, the target is able to initiate installation, activation, or any combination thereof of a related service application through a server mediated download operation based on device association. Explicit association between co-located devices enables certain other server mediated operations, such as content recommendations based on blended affinity metadata for co-located users.

One advantage of the disclosed systems and methods is that a control device may easily manage operations of a target playback device, including activation, installation, or any combination thereof of a corresponding service application. A second advantage is that a plurality of related devices may be associated with each other and advantageously interact using server-mediated operations based on association. This is in contrast to prior art solutions with complex, manual, and inefficient management procedures between two devices.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method implemented by a controller device for directing a target device to play a first title, comprising:
    discovering, by the controller device, the target device within a local network;
    exchanging, by the controller device, unique identifiers with the target device to establish an association with the target device;
    transmitting, by the controller device, a request to a content server machine to activate the target device, wherein the request indicates that the controller device is associated with the target device;
    determining, by the controller device, whether the target device includes a service application through which the target device can communicate with the content server machine; and
    if the target device includes the service application, then transmitting, by the controller device, one or more commands to the service application that direct the service application to stream the first title from the content server machine via a communication channel established between the target device and the content server machine.

2. The method of claim 1, wherein each of the unique identifiers comprises a number that is unique to a particular service.

3. The method of claim 1, wherein discovering comprises transmitting a multicast message to all devices in the local network.

4. The method of claim 3, wherein discovering comprises receiving a unicast message from the target device in response to the multicast message.

5. The method of claim 1, further comprising:
    determining, by the controller device, that the target device does not include the service application; and
    transmitting, by the controller device, a command to a configuration manager that resides in the target device, wherein the command identifies the service application and provides a location where the service application can be accessed by the configuration manager.

6. The method of claim 5, further comprising causing, by the controller device, the configuration manager to install the service application on the target device once the service application has been located and accessed.

7. The method of claim 6, further comprising instructing, by the controller device, the installed service application to request activation from the content server machine based on the exchanged unique identifiers.

8. A non-transitory computer-readable medium including instructions that, when executed by a processor included in a controller device, cause the controller device to direct a target device to play a first title, by performing the steps of:
    discovering the target device with a local network;
    exchanging unique identifiers with the target device to establish an association with the target device;
    transmitting a request to a content server machine to activate the target device, wherein the request indicates that the controller device is associated with the target device;
    determining whether the target device includes a service application through which the target device can communicate with the content server machine; and
    if the target device includes the service application, then transmitting one or more commands to the service application that direct the service application to stream the first title from the content server machine via a communication channel established between the target device and the content server machine.

9. The computer-readable medium of claim 8, wherein each of the unique identifiers comprises a number that is unique to a particular service.

10. The computer-readable medium of claim 8, wherein discovering comprises transmitting a multicast message to all devices in the local network.

11. The computer-readable medium of claim 10, wherein discovering comprises receiving a unicast message from the target device in response to the multicast message.

12. The computer-readable medium of claim 8, further comprising:
    determining that the target device does not include the service application; and
    transmitting a command to a configuration manager that resides in the target device, wherein the command identifies the service application and provides a location where the service application can be accessed by the configuration manager.

13. The computer-readable medium of claim 12, further comprising causing the configuration manager to install the service application on the target device once the service application has been located and accessed.

14. The computer-readable medium of claim 13, further comprising instructing the installed service application to request activation from the content server machine based on the exchanged unique identifiers.

15. A controller device configured to direct a target device to play a first title, the controller device comprising:
    a network interface circuit configured to communicate with other devices within a local network; and
    a processor coupled to the network interface and configured to:
        discover the target device with the local network;
        exchange unique identifiers with the target device to establish an association with the target device;
        transmit a request to a content server machine to activate the target device, wherein the request indicates that the controller device is associated with the target device;
        determine whether the target device includes a service application through which the target device can communicate with the content server machine; and
        if the target device includes the service application, then transmit one or more commands to the service application that direct the service application to stream the first title from the content server machine via a communication channel established between the target device and the content server machine.

16. The controller device of claim 15, wherein the target device does not include the service application, and the processor is further configured to transmit a command to a configuration manager that resides in the target device, wherein the command identifies the service application and provides a location where the service application can be accessed by the configuration manager.

17. The controller device of claim 16, wherein the processor is further configured to:
cause the configuration manager to install the service application on the target device once the service application has been located and accessed; and
instruct the installed service application to request activation from the content server machine based on the exchanged unique identifiers.

18. The controller device of claim 15, wherein to discover the target device, the processor is further configured to:
transmit a multicast message to all devices in the local network; and
receive a unicast message from the target device in response to the multicast message.

* * * * *